United States Patent [19]

Kigami et al.

[11] Patent Number: 5,561,566
[45] Date of Patent: Oct. 1, 1996

[54] INFORMATION RECORDING DISK AND DRIVE SYSTEM USING NO SECTOR ID TO INCREASE DATA STORAGE CAPACITY

[75] Inventors: Yuji Kigami, Sagamihara; Koji Kurachi, Yokohama; Takao Matsui, Yamato; Takashi Nakamura, Fujisawa; Tsutomu Numata, Sagamihara; Kenji Ogasawara, Fujisawa; Mayumi Okada, Fujisawa; Yuji Yokoe, Yokohama, all of Japan

[73] Assignee: International Business Machines Corporation, Armonk, N.Y.

[21] Appl. No.: 356,427

[22] Filed: Dec. 15, 1994

[30] Foreign Application Priority Data

Dec. 17, 1993 [JP] Japan ................................ 5-318780

[51] Int. Cl.$^6$ ........................................... G11B 5/09
[52] U.S. Cl. ................................... 360/48; 360/53
[58] Field of Search ............................ 360/48, 51, 53, 360/77.08

[56] References Cited

U.S. PATENT DOCUMENTS 5,422,763   6/1995   Harris ............................ 360/51

FOREIGN PATENT DOCUMENTS 0522750   1/1993   European Pat. Off. ........ G11B 20/12

*Primary Examiner*—W. Chris Kim
*Attorney, Agent, or Firm*—Roy W. Truelson; David W. Lynch

[57] ABSTRACT

A disk drive having embedded servo information accesses data without using sector identifier recorded in each sector. When a signal sector pulse signal (SP) at the end of a servo area is detected in a dead state during start up, a first data state for the start of a sector transits to a second data state for the litter region of the sector being divided in accordance with the capacity stored in a current sector's pointer register. At the beginning of the sector, the contents of a next sector's pointer register is stored in current sector's pointer register and the contents of a next sector's operation register is stored in a current sector's operation register. Upon completion of sector processing, the first data state is maintained when the next sector is contiguous. When a terminate instruction is stored in current sector's operation register, the process moves to dead state. When the servo area arrives, the process moves to idle state. Responsive to this state, the magnetic head is activated to enable read and write operation for sectors having no sector identifier on the disk.

11 Claims, 19 Drawing Sheets

ABA    00 01 02 03 04 05 06 07 08 09 10 11 12 13 14 15 16 17 18 19

LBA    00 01 02 -- 03 04 05 06 -- -- 07 08 09 10 11 -- -- 12 13

PLBA         03              07 07                    12 12 12

D_LST  03, 07, 07, 12, 12, 12, ...

FIG. 4

60 Current sector's pointer register
62 Next sector's pointer register
64 Current sector's operation register
66 Next sector's operation register

ZONE TABLE

| #ZONE | MIN_ABA | MAX_ABA | SCT_TRK | SCT_CYL | MIN_CYL | END_CYL |
|---|---|---|---|---|---|---|
| Z 0 | 0 | 102399 | 128 | 512 | 0 | 199 |
| Z 1 | 102400 | 191999 | 112 | 448 | 200 | 399 |
| Z 2 | 192000 | 345599 | 96 | 384 | 400 | 799 |
| Z 3 | 345600 | 473599 | 80 | 320 | 800 | 1199 |
| . | . | . | . | . | . | . |
| . | . | . | . | . | . | . |

FIG. 16

POINTER TABLE (ZONE #0)

| DT_SCT | #0 | #1 | #2 | #3 | #4 | #5 | . . . | #127 |
|---|---|---|---|---|---|---|---|---|
| SV_SCT | #0 | #0 | #1 | #1 | #2 | #2 | . . . | #63' |
| PTR | 200H | 200H | 200H | 200H | 200H | 200H | . . . | 200H |
| LAST | 0 | 0 | 0 | 0 | 0 | 1 |  | 1 |

FIG. 17

Table 3

POINTER TABLE (ZONE #1)

| DT_SCT | #0 | #1 | #2 | #3 | #4 | #5 | #6 | . . . | #111 |
|---|---|---|---|---|---|---|---|---|---|
| SV_SCT | #0 | #0 | #1 | #1 | #2 | #2 | #3 | . . . | #63 |
| PTR | 200H | 180H | 200H | 100H | 200H | 080H | 200H | . . . | 200H |
| LAST | 0 | 0 | 0 | 0 | 0 | 0 | 1 |  | 1 |

FIG. 18

Table 4

POINTER TABLE (ZONE #2)

| DT_SCT | #0 | #1 | #2 | #3 | #4 | #5 | . . . | #95 |
|---|---|---|---|---|---|---|---|---|
| SV_SCT | #0 | #0 | #1 | #2 | #2 | #3 | . . . | #63 |
| PTR | 200H | 100H | 200H | 200H | 100H | 200H | . . . | 200H |
| LAST | 0 | 0 | 1 | 0 | 0 | 1 |  | 1 |

FIG. 19

POINTER TABLE (ZONE #3)

| DT_SCT | #0 | #1 | #2 | #3 | #4 | . . . | #79 |
|---|---|---|---|---|---|---|---|
| SV_SCT | #0 | #0 | #1 | #2 | #3 | . . . | #63 |
| PTR | 200H | 080H | 100H | 180H | 200H | . . . | 200H |
| LAST | 0 | 0 | 0 | 0 | 1 |  | 1 |

FIG. 20

Virtual ID table (VID)                                38

| DT_SCT | #0  | #1  | #2  | #3  | #4  | #5  | #6  | . . . | #89 |
|--------|-----|-----|-----|-----|-----|-----|-----|-------|-----|
| SV_SCT | #0  | #0  | #1  | #1  | #2  | #2  | #3  | . . . | #59 |
| PTR    | 00H | 33H | 80H | 00H | 33H | 80H | 00H | . . . | 80H |
| LBA    | 55H | 56H | FFH | 00H | 01H | FFH | 02H | . . . | FFH |
| FLAG   | 00H | 01H | 02H | 00H | 00H | 02H | 04H | . . . | 82H |

FIG. 21

INFORMATION RECORDING DISK AND DRIVE SYSTEM USING NO SECTOR ID TO INCREASE DATA STORAGE CAPACITY

FIELD OF THE INVENTION

This invention relates to information recording disks and disk drive systems, and more specifically to information recording disks used in information recording devices such as data-recording hard disk drive units and disk drive systems using such information recording disks.

BACKGROUND OF THE INVENTION

As information recording media for recording a great amount of information used in computers or other machines, hard disk drive units (hereinafter referred to as HDD devices) have been implemented. The HDD device is provided with a number of magnetic recording disks (referred to as disks) and writes information in or reads it from a disk by positioning a read/write head onto a desired track defined on the disk.

Typically the disk in the HDD device is provided with a plurality of tracks, each of which is divided into data sectors (referred to as sectors) which are 128, 256, or 512 bytes. A divided sector is usually given an identifier of itself, i.e., a so-called sector ID, having a serial number of the sector, sector type, and sector identifying information such as DEFECT information indicating a bad sector originated from manufacturing. In a conventional HDD device, read and write operations are performed while the sector ID is referenced to determine whether the sector is the target or not.

The physical location of the sector can be determined from the face number of the disk (HEAD number), the cylinder number (CYL number), and the sector number (SCT number). The HEAD number and CYL number can be determined as a seek operation ends. The SCT number can be determined by reading information previously recorded on the disk, such as the servo area, or by counting from the beginning sector, since the SCT number changes with the rotation of the disk.

It is necessary for reading or writing information to perform operations for every sector, such as convening a logical sector into a physical sector and identifying a location on the disk where a corresponding sector belongs. This requires many types of information to be stored in the sector ID. Therefore the ID region has been made larger so as to prevent erroneous sector identifying information from being recorded as prerequisite sector identifying information is too large to be recorded. Then, an area for controlling the HDD device for each sector, i.e., an ID area of sector identifying information, has been affixed, thus necessitating reduction of the area where information can be recorded and which is originally provided in the HDD device by using the ID area.

To overcome this problem, there has been suggested an information recording disk whose sectors are so formatted that the ID area is not required for recording information (see JA5-174498).

SUMMARY OF THE INVENTION

Even with an information recording disk where the conventional ID area is not provided for each sector, a position identifying area such as a servo area is still needed to identify positions on the disk of the HDD device. Then a single sector can be divided by the servo area. An HDD device using an information recording disk without an ID area provided for every sector could recognize a single sector as multiple or assume that a corresponding sector has end when it actually has not, but is continuous.

With the aforementioned facts considered, the present invention is intended to provide an information recording disk capable of storing more information and readily reading information. It is another purpose of the present invention to provide a disk drive system which is capable of readily and rapidly reading and writing a greater amount of information.

In order to accomplish these and other objects of the invention, an information recording disk according to the preferred embodiments includes at least one servo area wherein position information is stored for identifying the track position; at least one track wherein an area outside said servo area is divided into a plurality of sectors of identical capacity including at least one sector which crosses said servo area; and a table for uniquely determining the position of each of a plurality of sectors, the table representing the relationship among a physical sector identifier for identifying each sector on said divided track based on said servo area, said position information, and the capacity of the sector crossing said servo area up to the crossing position.

In a first embodiment, a disk drive further comprises list storage means for sequentially storing as a pseudo logical sector identifier a logical sector identifier which should be given to a bad sector when sequentially specifying a logical sector identifier for identifying each sector other than the bad sector included in said track; a magnetic head for reading and writing information on the disk; storage means consisting of a first storage means for storing the structure of a current sector, a second storage means for storing the structure of the next sector, a third storage means for storing the operation of the current sector, and a fourth storage means for storing the operation of the next sector; calculating means referencing said list storage means for reading the number of logical sector position identifiers which is equal to or smaller than requested logical sector position identifiers and adding the number being read to the requested logical sector position identifiers to calculate a physical sector position identifier for a physical sector corresponding to the requested logical sector identifiers; processing means for taking actions for a corresponding sector in accordance with the structure of the current sector stored in said first storage means and the operation of the current sector stored is the third storage means; means for determining the beginning of a sector based of the structure of the current sector stored in said, first storage means after identifying the end of said servo area with an output signal from said magnetic head; and control means for exercising control so that, when said beginning of the sector is determined, to have the first storage means store the structure of the next sector stored in the second storage means and have the third storage means store the operation of the next sector stored in the fourth storage means and further to reference said table during processing by said processing means to have the second storage manes store the structure of the next sector including the physical sector position identifier calculated by said physical sector position calculating means and have the fourth storage means store the operation of the next sector.

In a second embodiment, a disk drive system further comprises a magnetic head for reading and writing information on said disk; means, assuming a virtual sector and virtual track which have a predetermined capacity, for creating a bad sector table comprising a virtual sector table wherein a physical sector identifier to be given to the position of a bad sector is sequentially stored as a pseudo logical sector identifier and a virtual track table for storing the pseudo logical sector identifier for the bad sector corresponding to the smallest physical sector identifier for the same track which is included in said virtual sector table, when sequentially specifying the physical sector identifier indicating the position of each sector other than the bad sector included in said track; means for creating a virtual ID table representing the structure of each sector in a virtual track, the virtual ID table having a physical sector identifier for identifying each sector on said divided track based on said servo area, said position information, the capacity of the sector crossing said servo area up to the crossing position, and the logical sector identifier, using said table and said bad sector table; and control means for referencing said virtual ID table to determine a virtual track and virtual sector which correspond to the position identifier of a requested logical sector and determining a physical sector corresponding to the determined virtual track and virtual sector to process for the determined sector.

The information recording disk preferably includes at least one servo area. This servo area stores position information for identifying the track position by means of, for instance, a servo pattern, thus allowing a sequence of track positions or multiple servo areas on the same track. An area without the servo area has at least one track. This track is divided by a plurality of sectors having the same capacities. At least one of such tracks includes a sector crossing the servo area. To uniquely determine the position of each of a plurality of sectors, the information recording disk includes a table representing the relationship among a physical sector identifier for identifying each sector on said divided track based on said servo area, said position information, and the capacity of the sector crossing said servo area up to the crossing position. Using this information recording disk eliminates the need for recording a sector ID for every sector, thus increasing the amount of information which can be recorded on the information recording disk. In addition, since the relationship between the physical sector identifier and the capacity up to a position where the servo area is crossed is stored in the table, the target sector can be readily searched even when there is a sector crossing the servo area.

The information recording disk according to the first embodiment preferably further includes in said information recording disk list storage means for sequentially storing as a pseudo logical sector identifier a logical sector identifier to be affixed to a bad sector when sequentially specifying the logical sector identifier for identifying each sector other than the bad sector included in the track. Thus the pseudo logical sector identifier is stored in the bad sector, and even when a read or write request indicates a logical sector, a corresponding physical sector can be readily searched by simple processing such as adding a stored number of pseudo logical sector identifiers to the requested logical sector identifier.

In the first embodiment, to uniquely determine the position of each of a plurality of sectors, a table of the structure of each sector is stored which represents the relationship among a physical sector identifier for identifying each sector on said divided track based on the servo area, the position information, and the capacity of the sector crossing the servo area up to the crossing position. Furthermore, a list storage means is used to sequentially store a logical sector identifier to be affixed to a bad sector as a pseudo logical sector identifier when sequentially specifying the logical sector identifier for identifying each sector other than the bad sector contained in the track. Therefore, the physical sector position calculating means can calculate the physical sector position identifier for a physical sector which corresponds to a logical sector identifier being requested from, for instance, a host computer by referencing the list storage means and adding to the requested logical sector position identifiers the number of logical sector position identifiers which is equal to or smaller than the requested logical sector position identifiers. This table and list storage means can be read from the information recording disk.

Since the sector ID is not recorded on the information recording disk, the disk drive system is provided with storage means configured with a number of storage elements such as registers for storing the structure and operation of the current sector. This storage means comprises a first storage means for storing the structure of the current sector, a second storage means for storing the structure of the next sector, a third storage means for storing operation of the current sector, and a fourth storage means for storing operation of the next sector. The sector determining means determines the beginning of a sector based on the structure of the current sector which is stored in the first storage means after identifying the end of the servo area by using, for instance, a servo sector pulse signal or output signal from the magnetic head. Thus, the first storage means has stored the structure of the current sector and whether the remaining portion of the current sector remains at the end of the servo area can be determined. When the remaining portion of the current sector remains there, the beginning of the next sector begins after the remaining capacity is passed. When it does not remain, the beginning of the next sector starts immediately after the end of the servo area. When the beginning of the sector is determined, the control means exercises control so that the first storage means stores the structure of the next sector which is stored in the second storage means and the third storage means stores the operation of the next sector which is stored in the fourth storage means. Consequently the storage means has stored the structure and operation of the sector at its beginning as those of the current sector. During processing by the processing means, since the structure and operation of the next sector can be updated in the second and fourth storage means, control is exercised by referencing the table so that the second storage means stores the structure of the next sector which includes the physical sector position identifier calculated by the physical sector position calculating means and the fourth storage means stores operation of the next sector. Therefore, the structure and operation of the next sector can be stored in the second and fourth storage means before processing for the current sector is completed. The processing means performs processing, e.g. reading and writing information, for the corresponding sector in accordance with the structure of the current sector which is stored in the first storage means and operation of the current sector which is stored in the third storage means.

The disk drive system of the second embodiment reads and writes information in the information recording disk using a magnetic head. Therefore the table can be read from the information recording disk. The bad sector table creating means assumes a virtual sector and virtual track which have a predetermined capacity, respectively, and when sequentially specifying the physical sector identifier indicating the position of each sector other than the bad sector included in the track as a logical sector identifier, creates a bad sector table comprising a virtual sector table storing sequentially the physical sector identifier to be provided for the position of the bad sector as a pseudo logical sector identifier and a virtual track table for storing the pseudo logical sector identifier for the bad sector which corresponding to the smallest physical sector identifier on the same track which is contained in said virtual sector table. Using this table and the bad sector table, the virtual ID table creating means creates a virtual ID table for representing the structure of each virtual sector on the virtual track wherein each structure corresponds to the sector ID, said table comprising a physical sector identifier for identifying each sector on said divided track based on the servo area, position information, the capacity of the sector crossing the servo area up to the crossing position, and a logical sector identifier. The control means references the virtual ID table to determine a virtual track and virtual sector which correspond to a requested logical sector position identifier and determines a corresponding physical sector in the determined virtual track and virtual sector to exercise control for processing on the determined sector.

In either embodiment, the magnetic head preferably comprises a recording portion for recording information in said information recording disk and a reading portion spaced apart by a determined amount from said recording portion for reading information from said information recording disk, the length of the head gap of said reading portion being substantially equal to the length of the head gap of said recording portion. Particularly, the length of the head gap of said reading portion is substantially equal to the width of said track.

The length of the head gap of the reading portion can be configured so as to approximately conform to the length of the head gap of the recording portion. This will improve the density of the track width which corresponds to the information recording density in the radial direction of the disk. Alternately, a magnetic head may be used which is so configured that the length of the head gap of the reading portion substantially conforms to the track width. This will also improve the density of the track width which corresponds to the recording density in the radial direction of the disk.

BRIEF DESCRIPTION OF THE DRAWINGS

FIG. 4 is a schematic diagram illustrating an example of a track including bad sectors.

FIG. 16 illustrates a zone table according to the present invention.

FIG. 17 illustrates a pointer table for zone #0 of FIG. 16 according to the present invention.

FIG. 18 illustrates a pointer table for zone #1 of FIG. 16 according to the present invention.

FIG. 19 illustrates a pointer table for zone #2 of FIG. 16 according to the present invention.

FIG. 20 illustrates a pointer table for zone #3 of FIG. 16 according to the present invention.

FIG. 21 illustrates a virtual ID table according to the present invention.

DETAILED DESCRIPTION OF THE PREFERRED EMBODIMENTS

Figure 1:
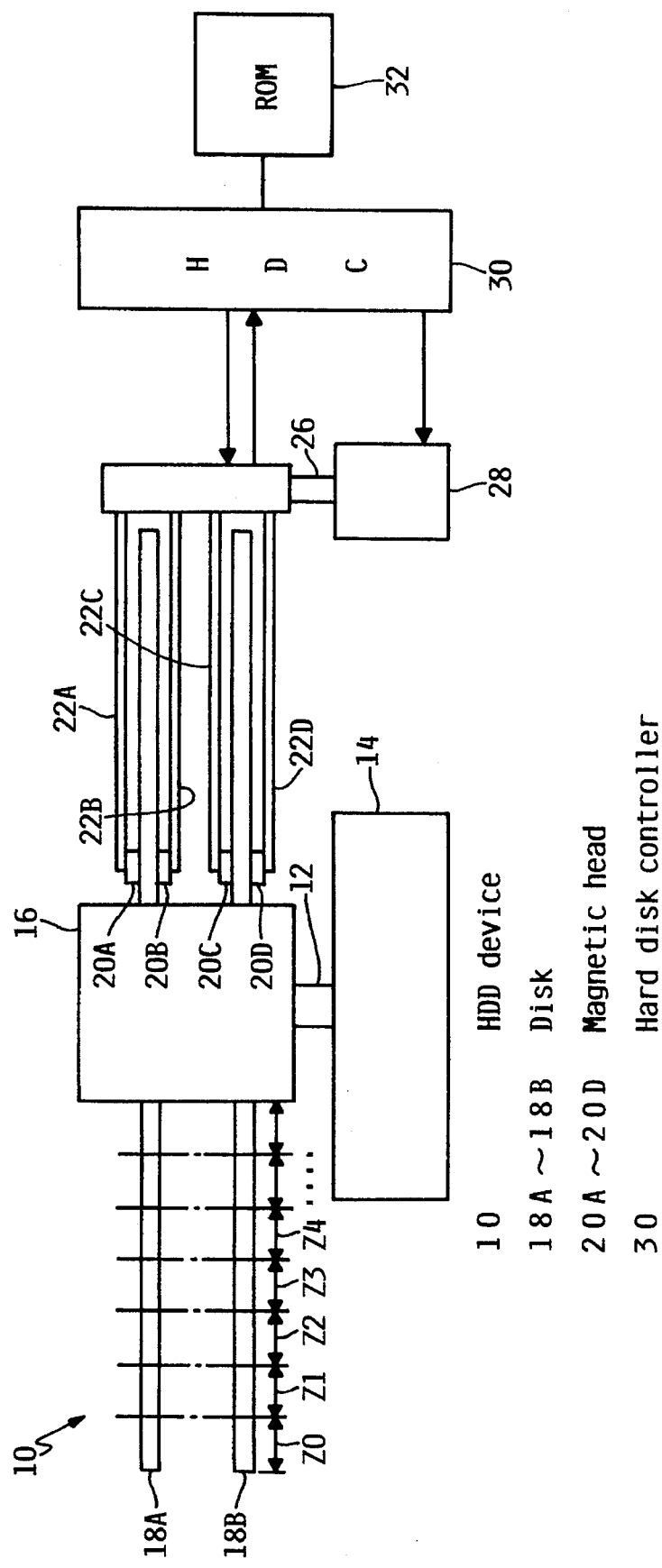
FIG. 1 is a schematic block diagram illustrating the structure of an HDD device to which the invention is applicable.

Referring to the drawings, embodiments of the present invention will now be described in greater detail. The first embodiment applies the invention to HDD device 10 employing a multiple-zone technique wherein a magnetic recording disk (hereinafter simply referred to as a disk) is divided in the radial direction into a predetermined number of areas (referred to as zones) and a sector servo mechanism is used to perform write and read operation from the inner to the outer circle of the disk at a predetermined line density.

FIG. 1 shows HDD device 10 related to the first embodiment. HDD device 10 is equipped with drive 14 for rotating shaft 12 at a high speed. Attached to shaft 12 is cylindrical support 16 so that both axes coincide. On the outer periphery of support 16 a number of (two in FIG. 1) disks 18A and 18B are attached at a predetermined space from each other. Disks 18A and 18B are formed to have predetermined thicknesses, each of which is made of a hard material with a magnetic material applied to both surfaces to use them as recording surfaces. In the center of disks 18A and 18B, a hole is provided which has approximately the same diameter as the outer dimension of support 16, which is inserted into this hole. Disks 18A and 18B are fixed at the outer periphery of support 16. Therefore, when shaft 12 is rotated by drive 14, disks 18A and 18B are rotated integrally with support 16.

Figure 2:
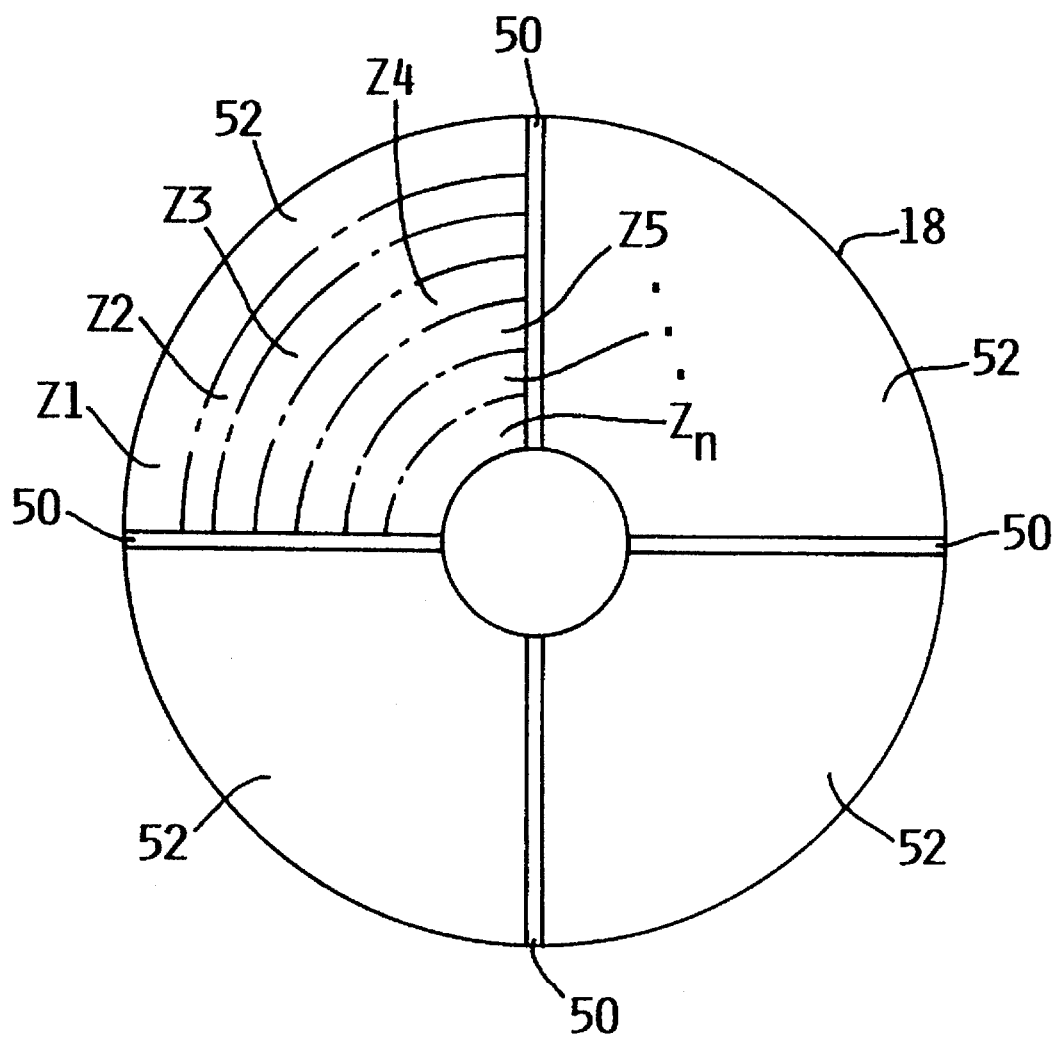
FIG. 2 shows an image of zones on the disk of the HDD device.

On each recording surface of disk 18A and 18B, as shown in FIG. 2, a plurality of servo areas 50 are formed radially in the radial direction of disk 18, with the remaining area formed as track regions 52. In servo areas 50, a servo signal (see FIG. 16), e.g. burst pattern, for indicating the direction of data track arrangement, for instance, is recorded. Corresponding to data tracks, a special code (e.g. area of approximately 1 usec where no signal is present) indicating the beginning of a pattern, and a gray code (cyclic binary code)

indicating, for example, the address of each data track, are recorded. In the end portion in the direction of rotation of servo area 50, there is recorded information for generating sector pulse signal SP indicating the end of servo area 50 (i.e., beginning of a sector). In data track area 52, a number of data tracks are formed concentrically with pitch P along the radial direction, and information is written in each data track in the rotational direction of disk 18 by a magnetic head described below.

HDD device 10 is provided with magnetic heads 20A to 20D having predetermined gap widths and lengths which correspond to recording surfaces of disks 18A and 18B. Each of magnetic heads 20A to 20D is configured with an MR element which includes a read element (not shown) for reading information and a write element (not shown) for writing information. Magnetic heads 20 A to 20 D are attached to the end portions of access arms 22 A to 22 D, respectively, and retained slightly above (e.g. approximately 0.1 to 0.2 micron) corresponding recording surfaces of disks 18A to 18B. Each rear end of access arms 22A to 22D is attached to support 24, which is in rum attached to drive 28 via shaft 26. Rotation of drive 28 by a predetermined angle will rotate access arms 22A to 22D. This rotation of access arms 22A to 22H causes each of magnetic heads 20A to 20D to move in the radial direction on each recording surface of disks 18A and 18B.

Drive 28 is connected to a hard disk controller (referred to as HDC) 30, to which the read and write elements (not shown) of magnetic heads 20A to 20D are also connected.

This embodiment defines as a logical block address (or LBA) the number of a sector to be specified when a read/write request is issued by another device such as a host computer. Also defined as an absolute block address (or ABA) is the number assigned sequentially in the order of sectors, for all sectors including defective sectors. In the following description, it is assumed a single sector is formatted with a storage capacity of 512 bytes.

As shown in FIG. 2, each of disks 18A and 18B is divided into zones Z0, Z1, Z2, Zn, where n is a predetermined number, and each zone has previously specified information, such as position information. For example, during manufacturing, zone Z0 has a reserved area ranging from a minimum absolute block address (or MIN_ABA) 0 to a maximum absolute block address (or MAX_ABA) 102399 and cylinders ranging from a minimum cylinder number (or MIN_CYL) 0 to an end cylinder number (END_CYL) 199, and is formatted so that the number of sectors per track (SCT_TRK) is 128 and the number of sectors per cylinder (SCT_CYL) is 512. Zones Z1 and higher have a similar configuration, which is shown in FIG. 16 below. Information associated with each zone shown in FIG. 16 is previously recorded in place on the disk. By referencing this zone table 32, it is possible to determine within which zone a specified sector starts.

Figure 3:
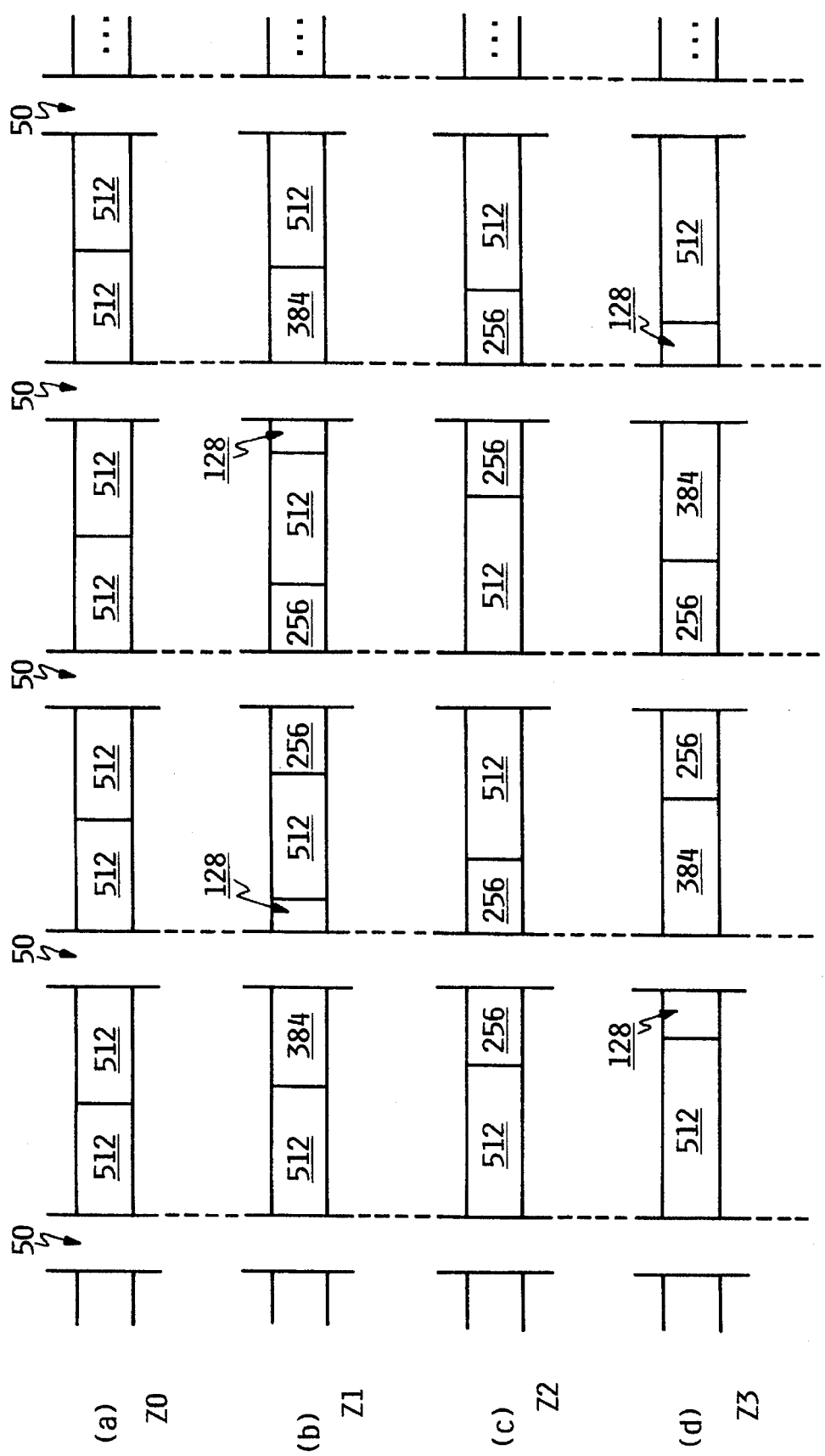
FIG. 3 shows an image of formatted zones on the disk.

In the present embodiment, since a write or read operation is performed over the disk from the innermost to outermost circle with a predetermined linear density, each zone will have a different storage capacity on disks 18A and 18B when rotated through an identical angle. That is, as shown in FIG. 3(*a*), when zone Z0 has an information storage of the whole capacity of two sectors (512×2 bytes) in data track area 52 between servo areas 50, zone Z1, as shown in FIG. 3(*b*), has an information storage of two-sector capacity (512+384 bytes), zone Z2 has an information storage of two-sector contents (512+256 bytes), as shown in FIG. 3(*c*), and zone Z3 has a two-sector capacity (512+128 bytes). Thus the storage capacity decreases as the disk track reaches the innermost circle. Along with this, a single sector can be divided.

In view of the above, in the embodiment, there is previously determined the relationship among a physical sector number (DT_SCT), servo number (SV_SCT), sector capacity up to a position where the sector is divided by servo area 50 (PTR), and information indicating whether a servo area is present between this sector and the next sector (LAST) for the sectors in each zone. This relationship is indicated as pointer table 34 and shown in FIGS. 17–20 for examples of zones Z0, Z1, Z2, and Z3. Also other pointer tables 34 for zone Z4 and later are specified at the time of fabrication. Pointer tables 34 for each zone, as shown in Tables 2 to 5 are previously recorded at predetermined positions.

Now bad sectors will be described. As shown in FIG. 4, when a block (sector) whose absolute block address ABA corresponds to 03, 08, 09, 15, 16, and 17 is defective, the logical block address skips this defective sector. For example, the logical block address whose absolute block address ABA corresponds to 04 is 03. For the skipped bad sector whose absolute block address ABA is 03, a value assumed to be assigned if it is not defective (03 in this example) is stored as value PLBA (PSUEDO LBA). All of stored values PLBA are sequentially stored as defect list D_LST.

Thus, absolute block address ABA can be determined by adding the number of values PLBA listed in defect list D_LST when logical block address LAB is specified. For example, when logical block address LBA=7 is specified, the values of defect list D_LST (three values of 03, 07, and 07 in this case) are added to obtain ABA=7+3=10.

$$ABA = LBA + (\text{number of PLBAs which are equal to or smaller than LBA}) \quad (1)$$

Figure 5:
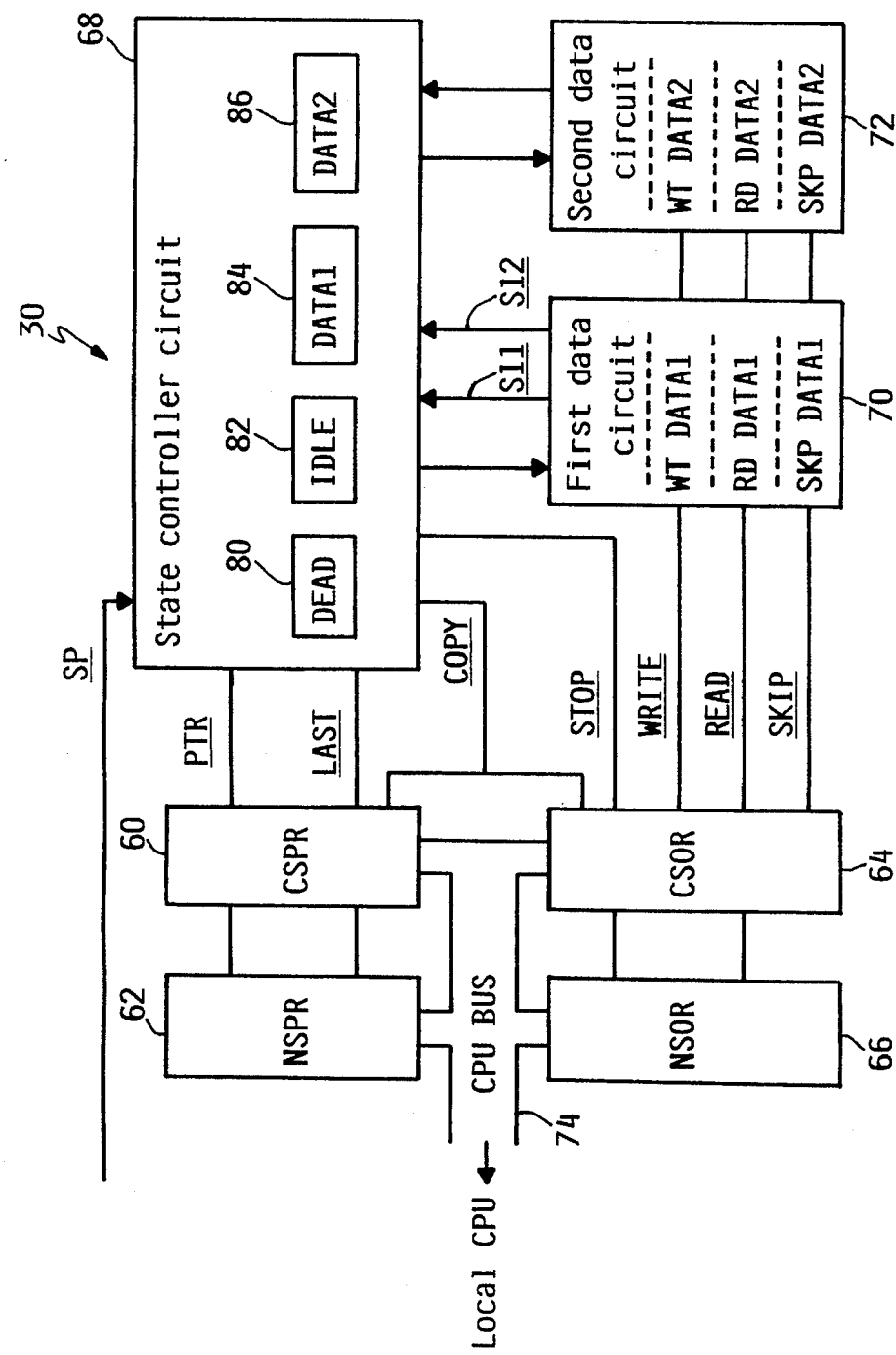
FIG. 5 is a block diagram illustrating the structure of the HDC of the HDD device to which the invention is applicable.

As shown in FIG. 5, HDC 30 has a local CPU (not shown) and includes registers, state controller 68, first data circuit 70, and second data circuit 72 described below. Registers include register 60 for storing the structure of a current sector (referred to as current sector's pointer register or CSPR), register 62 for storing the structure of the next sector (referred to as next sector's pointer register or NSPR), register 64 for storing operation of the current sector (current sector's operation register or CSOR), and register 66 for storing operation of the next sector (next sector's operation register or NSOR). These registers CSPR 60, NSPR 62, CSOR 64, and NSOR 66 are connected to local CPU (not shown) by bus 74 so that data can be transferred to each other.

State controller 68 is a circuit for controlling the states in which HDC 30 is operative. These states include dead state 80 where HDC 30 operation is prevented due to, for instance, a non-recorded area of a disk sector, idle state 82 in which operation of HDC 30 is paused, first data grate 84 indicating the state of data contained in a single sector from its beginning to the, end of servo area 50, and second data state 86 indicating the state of data in the later area of a single sector being divided by servo area 50. State controller 68 is connected to registers CSPR 60 and CSOR 64, and also connected to first data circuit 70 and second data circuit 72 which are provided for temporarily retaining data.

Figure 6:
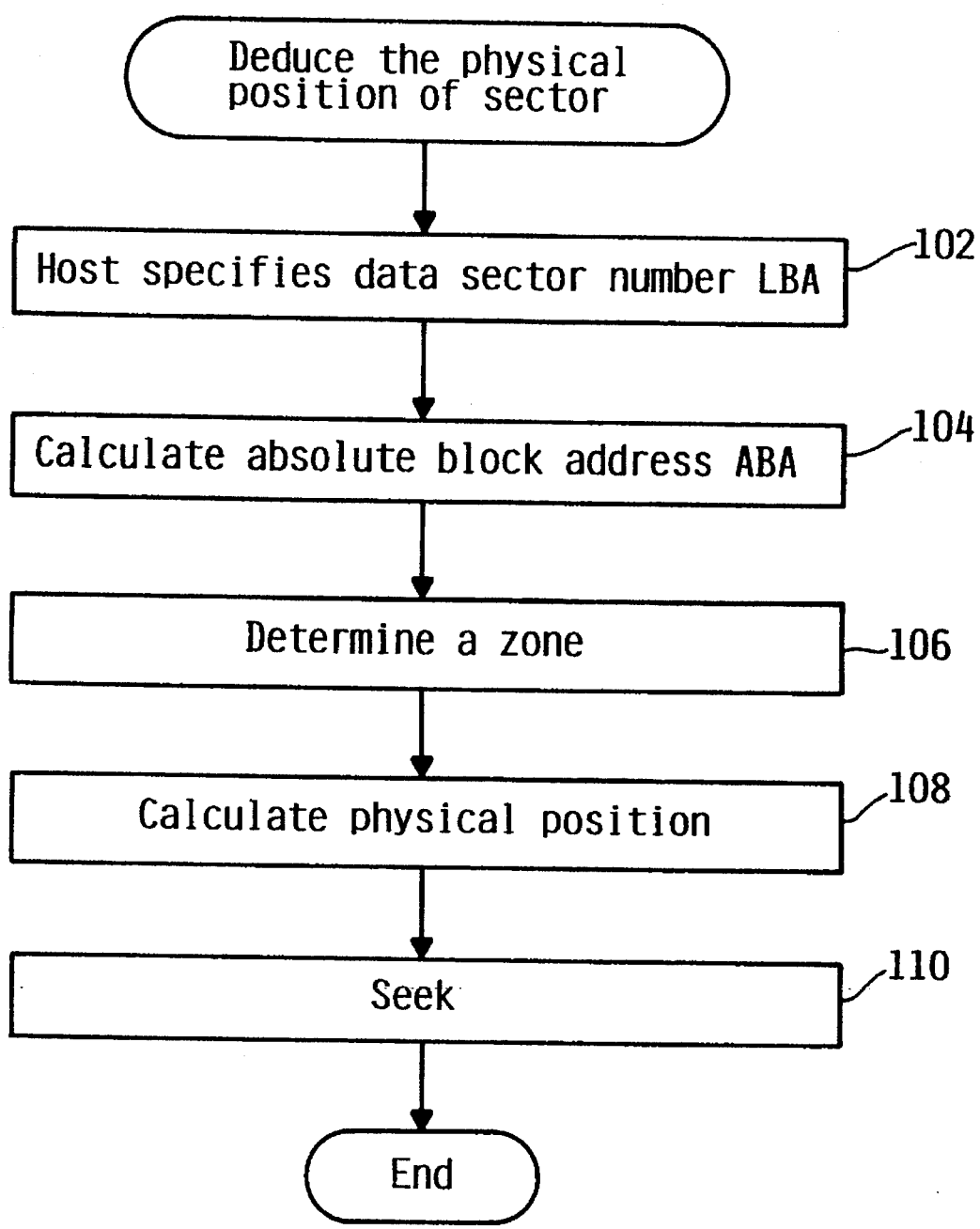
FIG. 6 is a flow chart illustrating the steps for deducing the physical position of sectors relative to the first embodiment.

Referring now to the figures, the operation of HDD device 10 according to the present invention will be described. As noted above, HDD device 10 of the invention has disks without the sector ID recorded in each sector. First, deduction of the physical position of target sectors will be described with reference to the flow chart shown in FIG. 6. A host device specifies a logical block address LBA which is a sector number to HDC 30 along with a data write or read request (step 102). HDC 30 references the defect list D_LST described above, and using equation (1), calculates an absolute block address ABA for all sectors including bad sectors which corresponds to the specified logic block address LBA at step 104. For example, in FIG. 4, when logical block address LBA07 is specified, absolute block address ABA=10 is calculated. Next HDC 30 references zone table 32 (Table 1) to determine zone Zn where the calculated absolute block address ABA belongs (step 106). Then a physical position within determined zone Zn is deduced as follows (step 108).

Assume the host device requests to read sectors from #L to #M for a logical block address LBA. Then a corresponding absolute block address ABA is calculated as #N, and the zone Zn to which it belongs is determined as #Z. Furthermore, it is assumed that the first absolute block address ABA is MIN_ABA (#Z) and the first cylinder is MIN_CYL (#Z). In this case, an absolute block address ABA (#N) can be represented by the following equation (2).

$$\#N = \#ZN + MIN\_ABA(\#Z) \quad (2)$$

where #ZN is the sector serial number in zone #Z which corresponds to #L of logical block address LBA.
The sector serial number #ZN can be represented by the following equation (3).

$$\#ZN = \#S + (SCT\_TRK\,(\#Z) \cdot \#HD) + (SCT\_CYL\,(\#Z) \cdot \#ZCYL) \quad (3)$$

where SCT_TRK (#Z) is the number of sectors per track in zone #Z and SCT_CYL (#Z) is the number of sectors per cylinder in zone #Z.

Therefore, for determining the absolute block address ABA (#N), the surface number (HD number), cylinder number (CYL number), and sector number (SCT number) of a magnetic disk will be as follows:

CYL number=#CYL=#MIN_CYL (#Z)+#ZCYL

HD number=#HD

SCT number=#S

Based on a physical position calculated as above, a seek operation is performed by switching and moving the head to a target cylinder (step 110).

Figure 7:
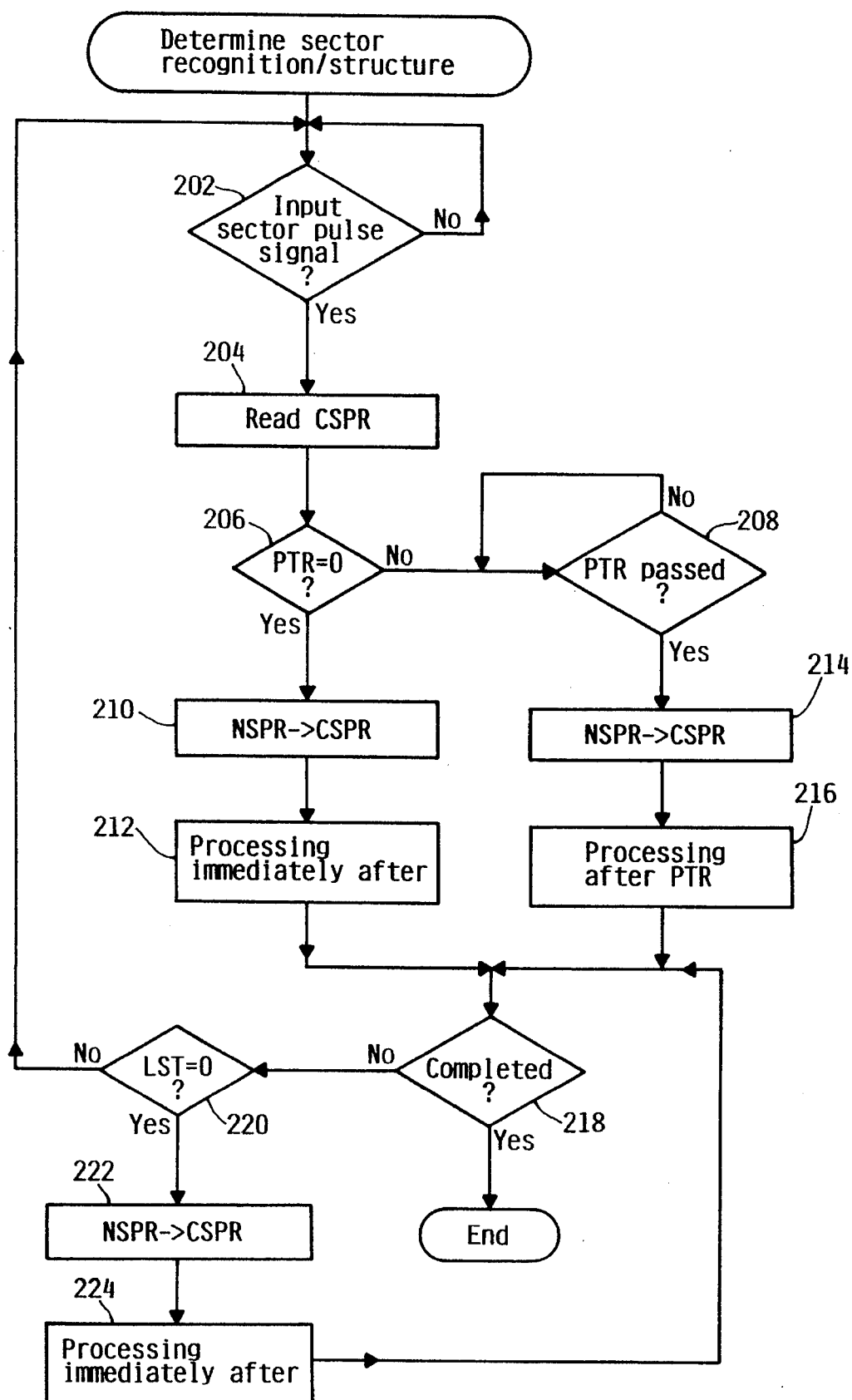
FIG. 7 is a flow chart illustrating the steps for sector recognition and structure determination relative to the first embodiment.

Next, sector recognition/structure determination will be described with reference to FIG. 7.

When a sector pulse signal SP indicating that servo area 50 has ended is input at step 202, current sector's pointer register CSPR 60 is read at step 204, and it is determined at step 206 whether or not sector capacity PTR, up to a position where the current sector is divided by servo area 50, is 0.

If the decision is positive, i.e., no division occurs, then the contents of the next sector's pointer register NSPR 62 are stored in CSPR 60 at step 210, and sector processing such as read and write is performed immediately after the sector pulse signal SP at step 212. On the other hand, if the decision is negative, the later section of the divided sector immediately follows the sector pulse signal SP. Then after the capacity indicated by the sector capacity PTR is passed (step 208), the contents of NSPR 62 are stored in CSPR 60 (step 214), and sector processing after sector capacity PTR is passed follows (step 216).

When processing is not completed for all sectors at step 218, it is determined whether or not information LAST, indicating the presence or absence of servo area 50 between the current sector and next sector, is 0 (step 220). If the answer is positive, i.e., LAST=0, then there exists another sector immediately after the current sector. The contents of NSPR 62 are then stored in CSPR 60 at step 222, and sector processing is performed immediately after sector pulse signal SP at step 224. Then step 218 is returned to to perform the above processing until all sectors are covered. On the other hand, if the answer is negative, i.e., LAST≠0, then another sector is absent in the current servo sector. The process returns to step 202, to await sector pulse signal SP for processing the next sector.

During processing for read or write operation (steps 212, 216, and 222), since the contents of NSPR 62 is stored in CSPR 60, NSPR 62 can be updated. Then the local CPU references pointer table 34 at a predetermined time during said processing to store information on the next structure in NSPR 62.

In this manner, the sector position can be recognized only with sector pulse signal SP even if no sector ID exists on the disk.

Said processing for a read or write operation, i.e., an operation on sectors, includes reading from sectors (READ), writing in sectors (WRITE), passing through a corresponding sector (SKIP), and temporary halt of processing (STOP), all of which are processed by referencing current sector's operation register CSOR 64. Similarly to the sector recognition/structure determination described above, next sector's operation register NSOR 66 can be specified during processing of the current sector. Thus, at the beginning of each sector, the contents of NSOR 66 are stored in CSOR 64, and thereafter it is possible to update the contents of NSOR 66. Therefore, during processing of the current sector, NSOR 66 can be specified.

Said sector recognition and structure determination as well as operations on sectors will now be further described with reference to FIGS. 8 and 9.

Figure 8:
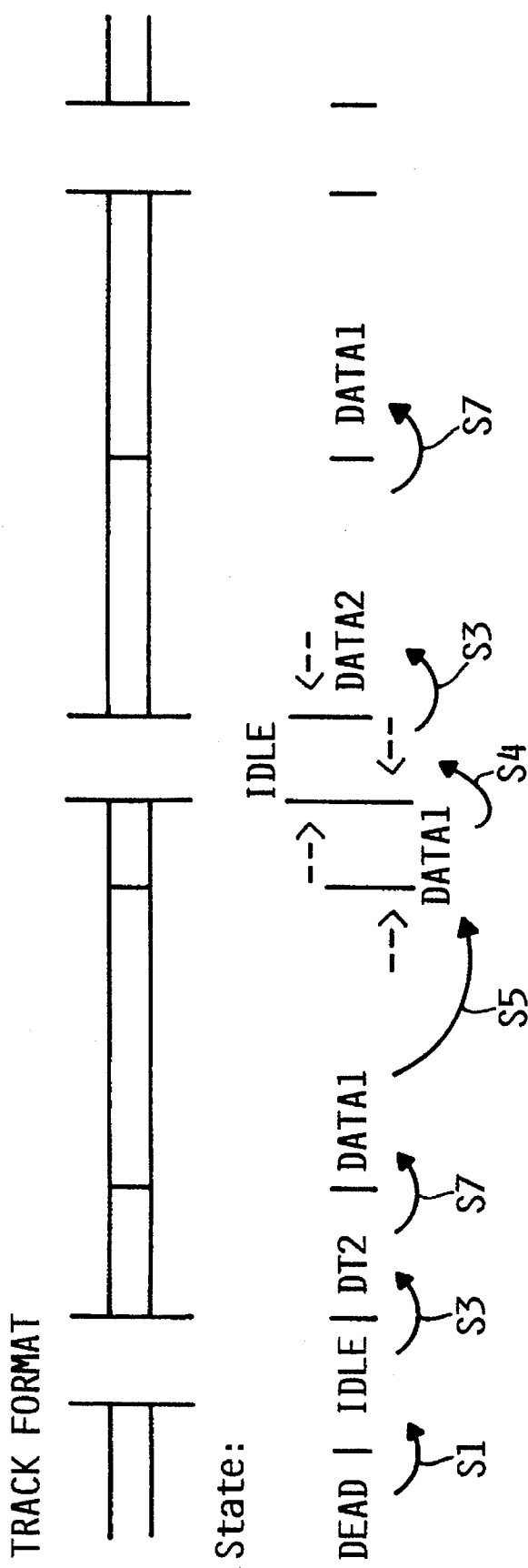
FIG. 8 shows an image of state transitions of a state controller in a construction of sectors in a predetermined track in predetermined zone Zn.
Figure 9:
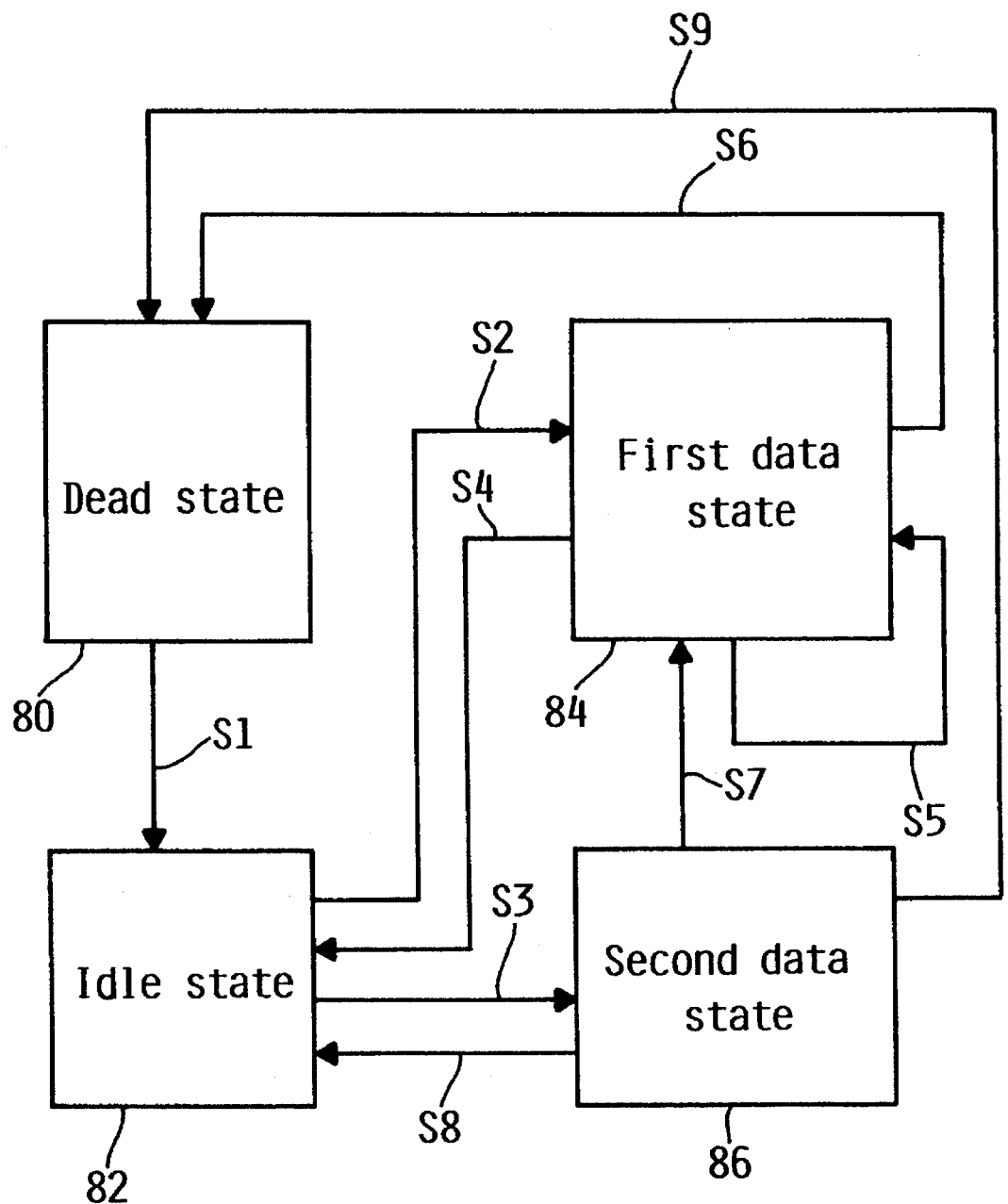
FIG. 9 shows an image of state transitions of the state controller.

FIG. 8 shows an image of the sector structure on a predetermined track in predetermined zone Zn and transition of the state of state controller 68. During start up of HDC 30, state controller 68 is in dead state 80. It changes to idle state 82 when HDC 30 initiates control (see arrow S1 in FIG. 9), and remains in this state until the sector pulse signal SP is detected. Upon detection of sector pulse signal SP, based on sector capacity PTR (up to a position where the current sector is divided by servo area 50) stored in CSPR 60, state controller 68 moves to first data state 84 or second data state 86. That is, since PTR=0 indicates that the sector to be read or written is in its beginning, state controller 68 moves to first data state 84 (see arrow S2 in FIG. 9). On the other hand, if PTR≠0, state controller 68 moves to second data state 86 since the later portion of the sector which is divided by servo area 50 is present (see arrow S3 in FIG. 9).

If HDC 30 is in first data state 84 and sector capacity PTR≠0, then the current sector is divided. Therefore, state controller 68 receives halt signal S11 from first data circuit 70 (see FIG. 5) after the operation on the former portion is completed, and then moves to idle state 82 (see arrow S4 in FIG. 9). At this time, if information LAST=1, end signal S12 is input from first data circuit 70 in state controller 68 (see FIG. 5) after operation on one sector is completed, and idle state 82 is then entered. If processing for a single sector is completed and information LAST=0, then the next sector is contiguous, and first data state 84 is again entered (see arrow S5 in FIG. 9). At this time, if a stop data indicating the end of processing by HDC 30 is stored in CSOR 64, dead state 80 is entered (see arrow S6 in FIG. 9).

When HDC 30 is in second data state 86 and information LAST=0, the next sector follows the divided current sector. Then first data state 84 is entered (see arrow S7 in FIG. 9) after operation on the second data is completed. When information LAST≠0, servo area 50 follows the divided current sector. Thus, after operation on the second data is completed, idle state 82 is entered (see arrow S8 in FIG. 9). At this time, if the stop data indicating the end of processing by HDC 30 is stored in current sector's operation register CSOR 64, dead state 80 is entered (see arrow S9 in FIG. 9).

Operating the magnetic head in accordance with this state of HDC 30 allows read and write operation to a sector which has no sector ID on the disk. Repeating these steps allows read and write operations for all desired sectors.

A second embodiment, which uses a virtual ID table (VIT) 38, as illustrated in FIG. 21, corresponding to the sector ID to accomplish write and read operation to the disk without using the sector ID recorded on the disk, will now be described in greater detail. The second embodiment has a configuration similar to the first embodiment, and identical numerals are used to designate identical elements.

To accomplish read and write operation to the disk without using the sector ID recorded on the disk, it is necessary to provide information which corresponds to the sector ID. Virtual ID table (VIT) 38 according to the second embodiment covers all information provided as the prior art sector ID information, and as shown in FIG. 21 below, is a table combining pointer table 34 according to the first embodiment with logical block address LBA and information FLAG. For the values of logical block address LBA, the least significant bytes are used since there is no variation in higher bytes. Information FLAG is represented by one byte and configured with flag ETR_FL (EOT FLAG) to be set as bit 0 if the sector is the last sector in a track, flag DEF_FL (DEFECT FLAG) to be set as bit 1 if the sector is a bad sector, flag RES_FL (REASSIGN FLAG) to be set is bit 2 if the sector becomes corrupted after shipping to become unusable, and flag ETB_FL (EOTBL FLAG) to be set as bit 7 if this is the last element of virtual ID table 38.

Since servo area 50 on the disk permits servo number SV_SCT to be detected, comparing this servo number SV_SCT with servo number SV_SCT in virtual ID table 38 allows detection of current physical sector number DT_SCT (details described below).

Since no sector ID is recorded on the disk according to said embodiment, the format for formulating the disk is considered only for recording data over the entire surface of the disk. Any bad sector contained in this disk is recorded in a predetermined cylinder previously specified by defect list D_LST.

In said embodiment, defect list D_LST is referenced and equation (1) is used to calculate absolute block address ABA corresponding to a specified logical block address LBA (such as step 104). In the second embodiment, defect table 40 is used which is described below with reference to FIG. 10. This defect table 40 is created during formatting described above.

In this embodiment, a virtual track is assumed to have 10000H (65536) sectors, and the position of a bad sector is specified by virtual track VT and virtual sector VS.

Figure 10:
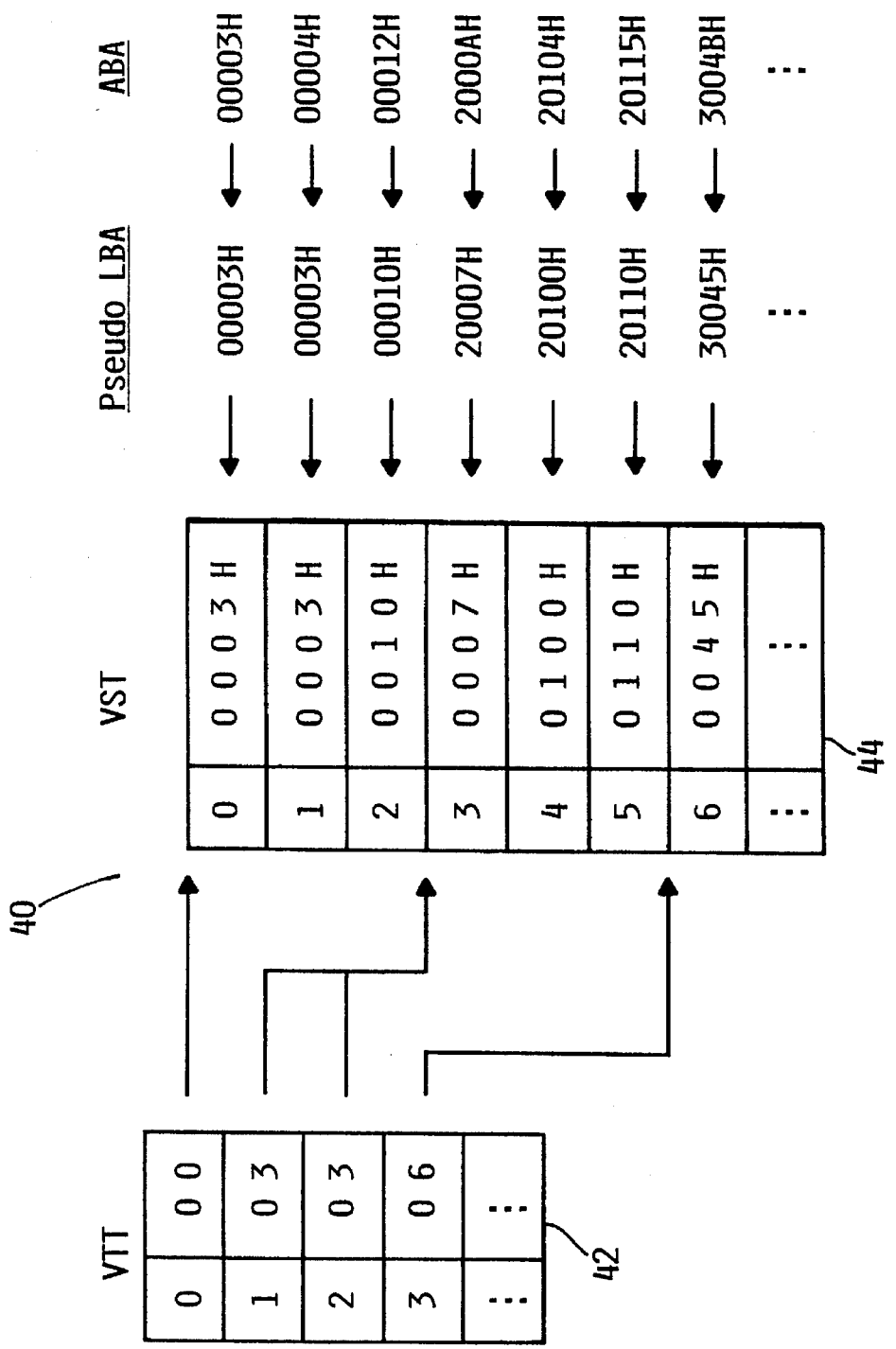
FIG. 10 is a conceptual diagram illustrating the structure of a virtual sector table and virtual track table relative to the second embodiment.

Defect table 40 composes virtual track table (VTT) 42 and virtual sector table (VST) 44. As shown in FIG. 10, virtual sector table 44 stores pseudo LBAs (corresponding to values PLBA in the first embodiment) for a bad sector in ascending order of absolute block addresses ABA, and virtual track table 42 stores values representing the order where the smallest bad sector belonging to virtual track VT which corresponds to the number of each element is located.

Each item of virtual sector table 44 is two bytes, and the required number of items corresponds to the maximum number of bad sectors which is acceptable for the HDD device. Assuming the maximum number is 1000, virtual sector table 44 requires a storage capacity of 2000 bytes. For example, if the HDD device has a capacity of 500 megabytes, 18 items are sufficient for virtual track table 42 and a storage capacity of 36 bytes is sufficient. Therefore defect table 40 will have a storage capacity of 2036 bytes. On the other hand, if virtual track table 42 and virtual sector table 44 are not used, three bytes are needed for one bad sector. Then defect table 40 requires a storage capacity of 3000 bytes, thus occupying an extra capacity.

Figure 11:
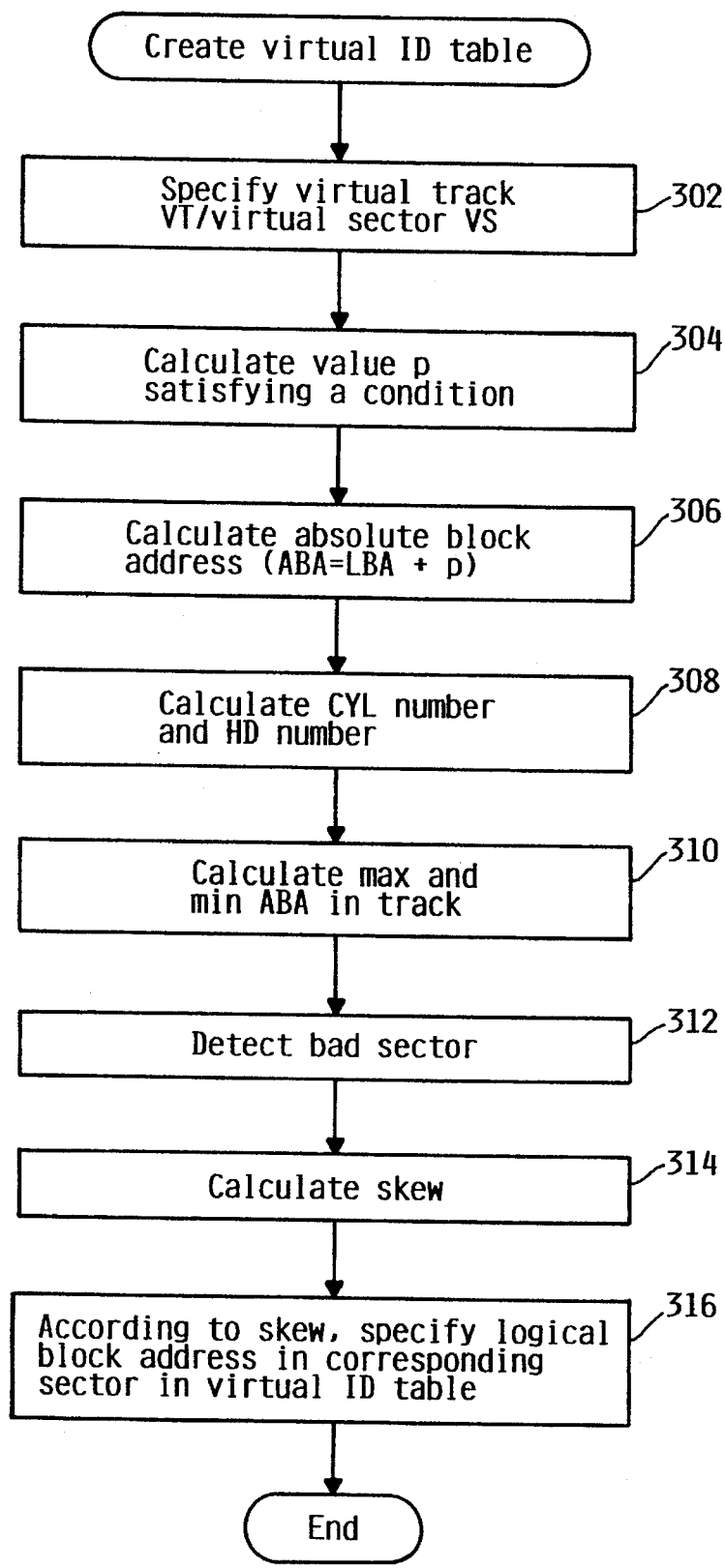
FIG. 11 is a flow chart illustrating the creation of a virtual ID table relative to the second embodiment.

Referring now to the flow chart shown in FIG. 11, creation of virtual ID table 38 will be described in detail. Virtual ID table 38 is created by using defect table 40 described above. It is also created for the track where the beginning sector belongs, when a read/write request is issued by another device such as a host computer. Virtual ID table 38 is also created when a seek operation transits to the next track after the last sector in a track is processed or read/written.

Upon a read request or write request being issued from a host device, or the logical block address LBA, which is a sector number, being specified as the next track, the virtual track VT and virtual sector VS are specified by using the following equation (4).

$$VT = LBA/NSEC\_VT$$

$$VS = LBA\%NSEC\_VT \qquad (4)$$

where NSEC_VT is the number of sectors per virtual track (=10000H), and % is an operator for determining the residue of division.

Using a specified virtual track VT and virtual sector VS, a value p which satisfies the following equation (5) is determined at step 304.

$$VST[p-1] <= VS < VST[p]$$

$$VTT[VT] <= p < VTT[VT+1] \qquad (5)$$

where VST [x] is a value from the virtual sector table and VTT [x] is a value from the virtual track table.

The determined value p corresponds to the number of pseudo LBAs (values PLBA) listed in the defect list D_LST. Thus, as in equation (1), adding the value p to the logical block address LBA determines the absolute block address ABA (step 306). Next, the following equation (6) is used to determine the surface number HD and cylinder number CYL of the magnetic disk which contains the absolute block address ABA at step 308.

$$CYL = ABA/(NM\_HD \cdot SCT\_TRK)$$

$$HD = (ABA\%(NM\_HD \cdot SCT\_TRK))/SCT\_TRK \qquad (6)$$

where NM_HD is the number of heads per track. In equation (6), NM_HD·SCT_TRK may be SCT_CYL.

The maximum value MAX_TRK and minimum value MIN_TRK of the absolute block address ABA for the sector included in the track specified by these magnetic disk surface number and cylinder number are determined by using the following equation (7) at step 310, and for the sector included between the determined maximum value MAX_TRK and minimum value MIN_TRK of the track, any bad sector defined by virtual track table 42 and virtual sector table 44 is extracted at step 312. At this time, if a bad sector exists, the process sets the flag DEF_FL (DEFECT FLAG) of virtual ID table 38 which corresponds to the current sector.

$$MIN\_TRK=(CYL\cdot NM\_HD+HD)\cdot SCT\_TRK$$

$$MAX\_TRK=MIN\_TRK+SCT\_TRK-1 \qquad (7)$$

Since the disk rotates constantly and during movement on the track (seek) varies by a predetermined amount (skew) from a straight line in the radial direction, the skew on the target track is calculated at step 314, and the physical sector in virtual ID table 38 which corresponds to the skew is used to set the logical block address LBA to increase the logical block address LBA for the next sector at step 316. At this time, the corresponding sector is skipped if the flag DEF_FL is set.

The initial value of logical block address is LBA MIN_TRK−m (m is the number of bad sectors which is smaller than the maximum value MIN_TRK of the absolute block address ABA for the sector included in the track).

For skew calculation, a previously recorded skew table, representing the amount of skew per track along with differences in devices such as drives for each HDD device 10, is used.

Figure 12A:
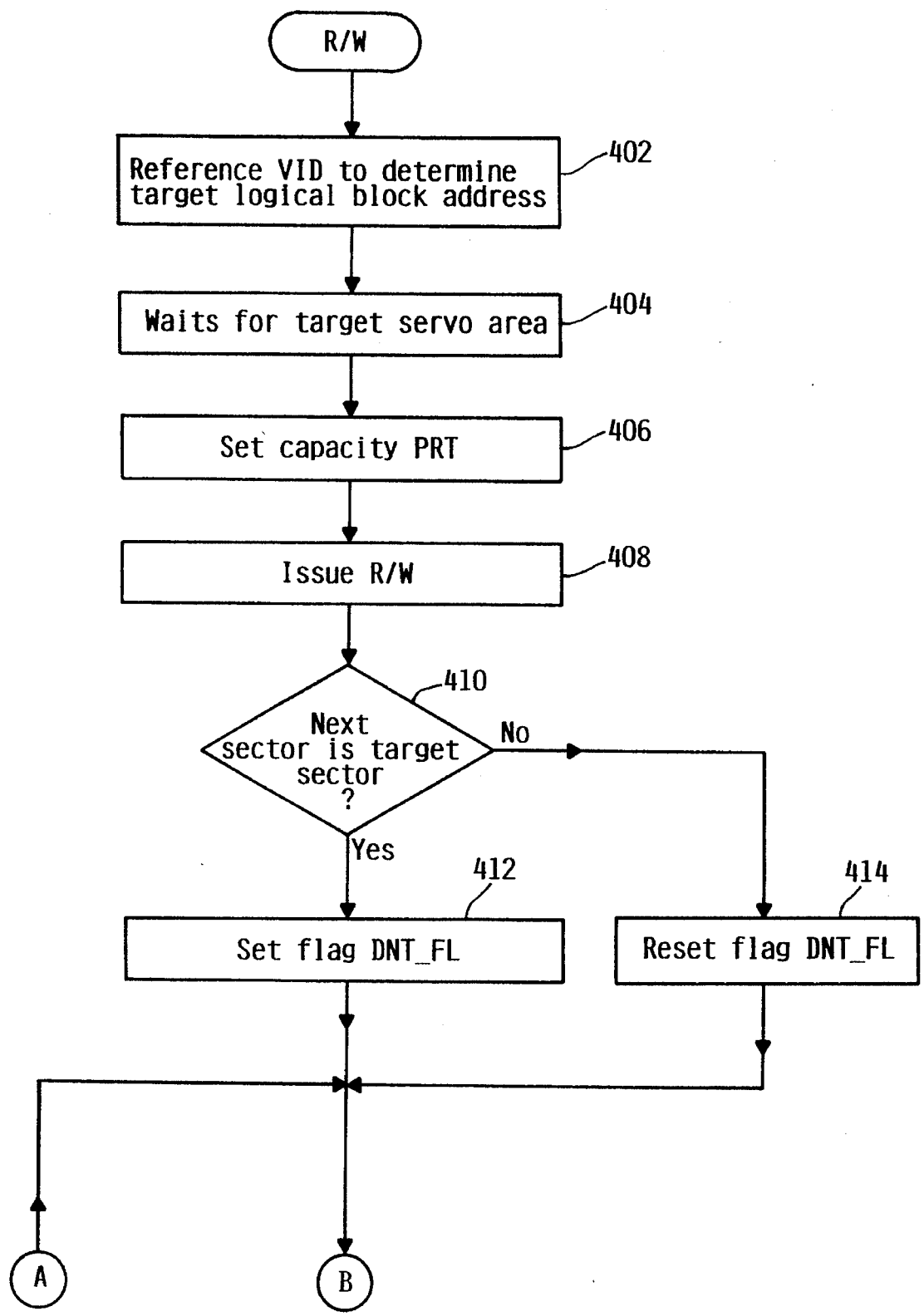
FIG. 12 is a flow chart illustrating read and write operation for information using the virtual ID table relative to the second embodiment.
Figure 12B:
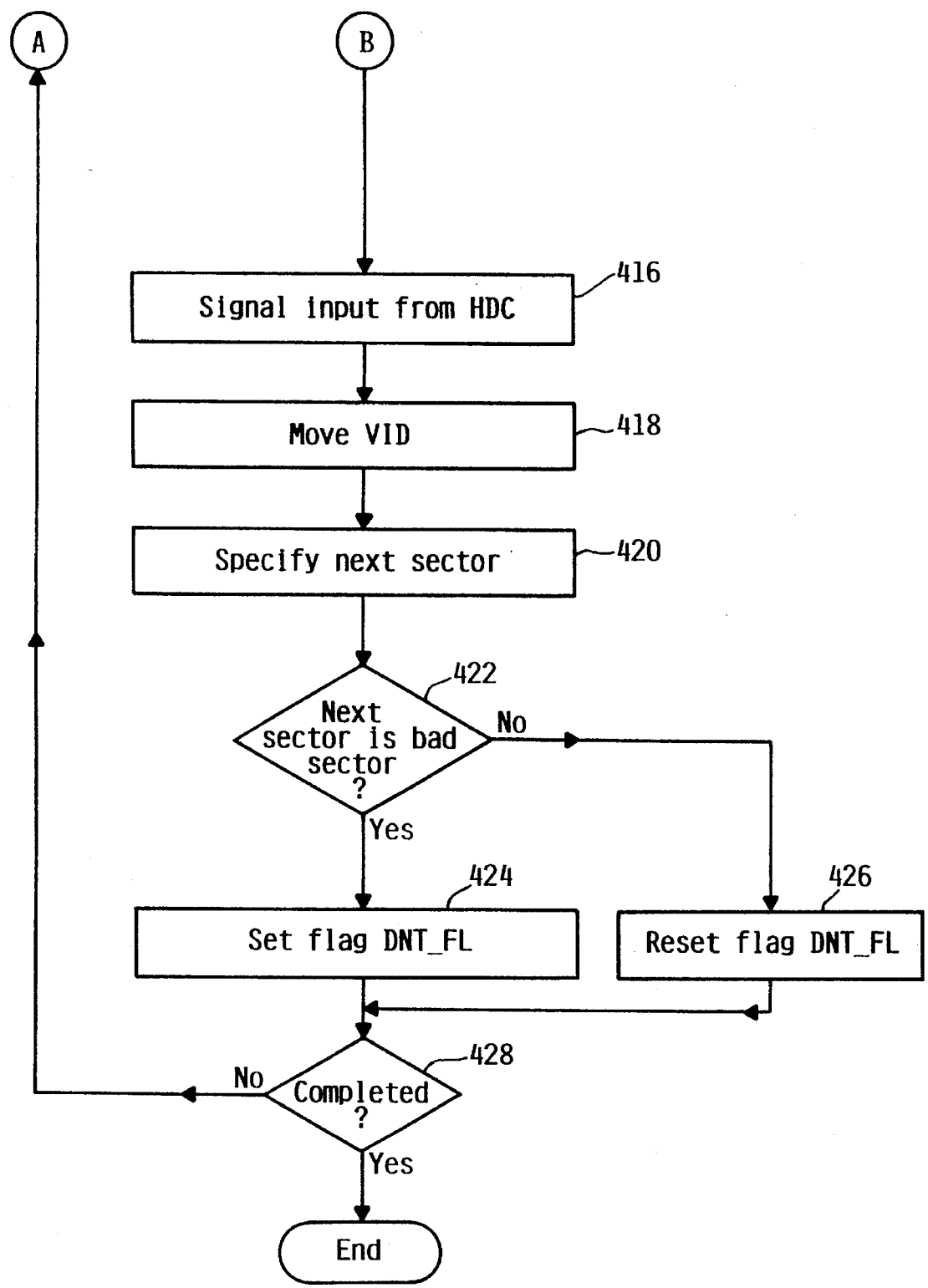

Processing of read and write operations to the disk using virtual ID table 38 according to the present embodiment will now be described with reference to the flow chart shown in FIG. 12.

When the process moves to processing of the logical block address LBA specified by a host device, virtual ID table 38 is referenced to determine a physical sector DT_SCT which corresponds to the logical block address LBA of the target sector at step 402. Also reference is made to virtual ID table 38 to read a servo number SV_SCT in the determined physical sector DT_SCT, and the process waits for the completion of reading by the magnetic head of the servo area 50 being decremented by 1 (SV_SCT−1) at step 404. Then a sector pulse signal SP is input and a capacity PTR is set when the end of the servo area 50 decremented by 1 is reached (step 406). Next an instruction for a read or write operation is issued to HDC 30 at step 408.

Whether the target sector exists immediately after the sector pulse signal SP is determined at step 410 by referencing the servo number SV_SCT in the virtual ID table. If the answer is positive, the flag DNT_FL is set at step 412. If the answer is negative, the flag DNT_FL is reset at step 414.

This flag DNT_FL indicates whether the next sector's information is to be read or information is to be written in the next sector. If this flag is being set, a read or write operation is made from the beginning of the next sector. If this flag is being reset, the next sector is skipped.

The steps described above correspond to steps 202 to 216 in FIG. 7. Upon reaching the beginning of the sector, a signal is input from HDC 30 at step 416 to move the corresponding physical block address in virtual ID table 38 (step 418), and the corresponding information of the moved physical block address in virtual ID table 38 is set in HDC 30 for the next sector at step 420.

The processing described above corresponds to processing by NSPR 62 for referencing pointer table 34 at a predetermined time in an updatable state, to store the next structure information in NSPR 62.

With reference to virtual ID table 38 being moved, the process determines whether or not the next sector is a bad sector at step 422. If the decision is positive, flag DNT_FL is reset before returning to step 416 (step 424). If the decision is negative, flag DNT_FL is set before step returning to 416 (step 426). This processing is repeated until all target sectors are covered (step 428).

In this manner, the present embodiment allows the sector ID to be generated using a defect table even with a track having contiguous sectors of recorded data without sector ID, or with a track where a sector is divided by the servo area. Since using a virtual ID table corresponding to the sector ID permits the absolute block address of the disk to be determined, information can be read or written to the sector being requested by a host device without consuming extra memory elements or capacity.

The table described above may be recorded in the boot track in a predetermined cylinder on the disk, or be stored in ROM 32 provided in the HDD device.

As described above, using HDD device 10 eliminates the need for recording the sector ID. Thus, it is possible to read and write information an increased amount of information on the disk.

Figure 14:
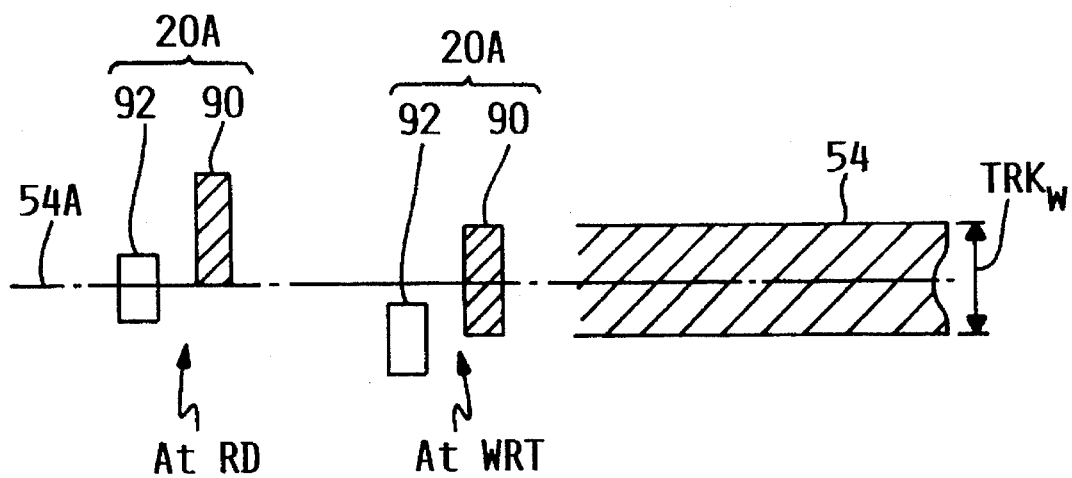
FIG. 14 is a conceptual diagram illustrating the positions of an MR element during write and read operation in a prior art HDD device.

The magnetic head, as in the aforementioned embodiments, comprises an MR element. It is well known in the art that its writing portion for recording information and reading portion for reading information are offset by a predetermined amount (e.g., several micrometers) toward the radial direction of the disk. Thus, when the magnetic head is so configured that it turns around an axis assumed as an extension to the writing and reading portions for movement (see FIG. 1), this offset will vary in the radial direction with the turn angle. In view of this, in a conventional HDD device, different set positions of the MR element have been used to accommodate both read operation (RD) and write operation (WRT) so that the corresponding magnetic head is positioned immediately above the desired data area. For example, in magnetic head 20A, as shown in FIG. 14, the MR element is so configured that writing element 90 for recording information and reading element 92 for reading information are spaced apart by a predetermined amount. During a read operation (RD), magnetic head 20A is located so that reading element 92 is positioned immediately above center line 54A of the track. During a write operation (WRT), magnetic head 20A is located so that writing element 90 is positioned immediately above center line 54A of the track.

Figure 15A:
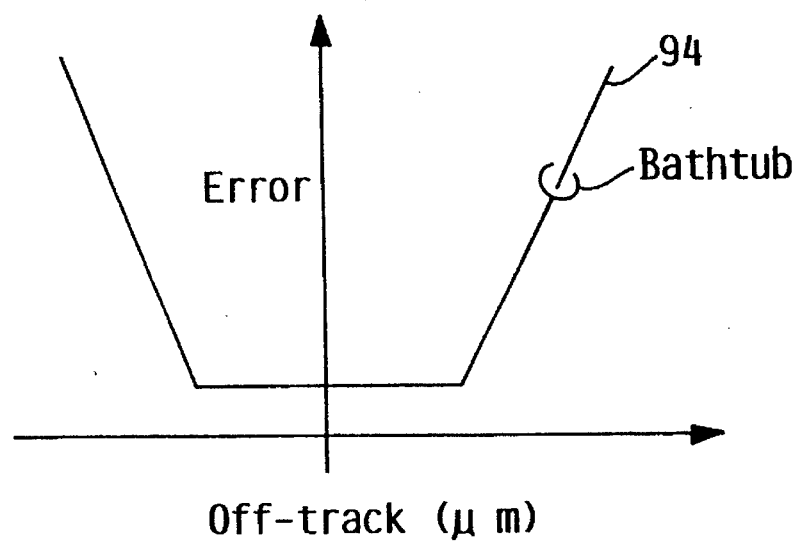
FIGS. 15a–b show the relation between the amount of off-track and read error and an image of an information recorded state in a servo area.

In the prior art HDD device, since the sector ID must be read from the disk, it is necessary for the reading portion to read the sector ID even during a write operation (WRT). Thus the conventional magnetic head has been configured so that it can read the sector ID during the writing of information (WRT). The length of each head gap has been determined so that read operation is possible even when the position of the magnetic head is offset from the position specified by a track width TRKw toward the radial direction of the disk. As an indicator which takes into account the relation between this amount of off-track and error rate during read operation, there is OFF TRACK Performance or Error Rate Bathtub as shown in FIG. 15a. Using this indicator allows an optimum magnetic head to be configured for the HDD device. Then, when magnetic head 20A regulated by the length of the head gap of read element 92 (referred to as gap length RDw) is located approximately within the width of track 54, the amount of error becomes minimum, and characteristic curve 94 will indicate the amount of error which linearly increases with the amount of off-track. Therefore, the magnetic head is designed to have a characteristic curve 94 indicating a lower amount of error over a wide range (so-called wider bathtub). Conventionally, in view of this, the length of the head gap of write element 90 (referred to as gap length WTw) has been made longer than the gap length RDw.

However, since the signal-to-noise ratio is proportional to the gap length RDw, the limit value of gap length RDw is defined to maintain a minimum amount of error. This requires a longer gap length WTw (e.g., 1.0 um). However, a longer gap length WTw will increase the track width TRKw. This has precluded improvement of the information recording density in the radial direction of the disk.

HDD device 10 to which the present invention is applicable does not require any sector ID to be recorded on the disk. Comparing a conventional HDD device with HDD device 10 according to the invention, data is written in the recording area with a predetermined offset in relation to the sector ID recording area for a single sector (see FIG. 13(a)) in the conventional HDD device, while in HDD device 10 according to the invention, data can be written in aligned recording areas (see FIG. 13(b)). Therefore, the magnetic head design does not require considerations for obtaining a wider bathtub, and the gap length WTw can be specified up to a length approximately conforming to the gap length RDw.

The present inventors have found that the information recording density in the radial direction of the disk improves approximately over 10% in HDD device 10 according to the invention in comparison with the prior art HDD device which has a gap length WTw of approximately 1.0 um, by a magnetic head design with the gap length WTw specified at 0.5 um or below.

Figure 15B:
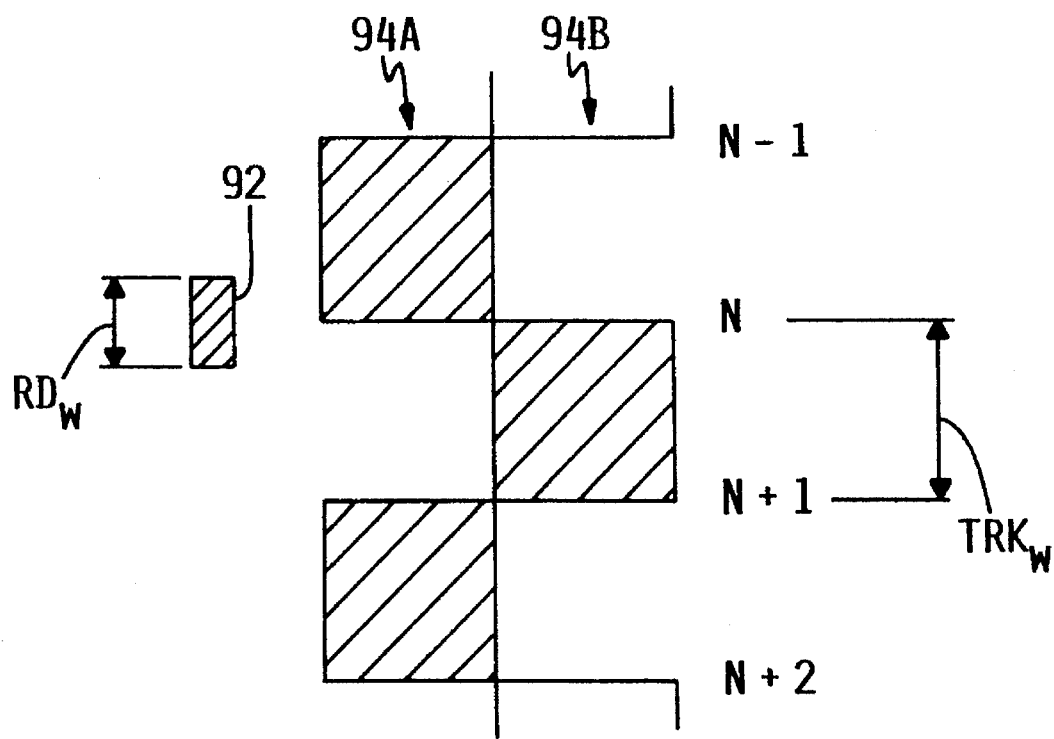

As shown in FIG. 15b, servo area 50 includes servo Signal 94A and servo signal 94B wherein, for instance, a burst pattern is formed in a staggered fashion in the radial direction of the disk. Normally, to obtain position information from the servo area 50, the read element of the magnetic head is located so that it crosses this staggered servo signal 94 A and servo signal 94B. Thus, with a relative relationship between the gap length RDw of the read element and track width TRKw, detection of the servo signal will decrease with the amount by Which the magnetic head is off-track, and when the gap length RDw is extremely smaller than the track width TRKw, only a slightly off-track head makes it impossible to obtain position information. Consequently, positioning accuracy must be higher and in some cases position information cannot be obtained.

Figure 13:
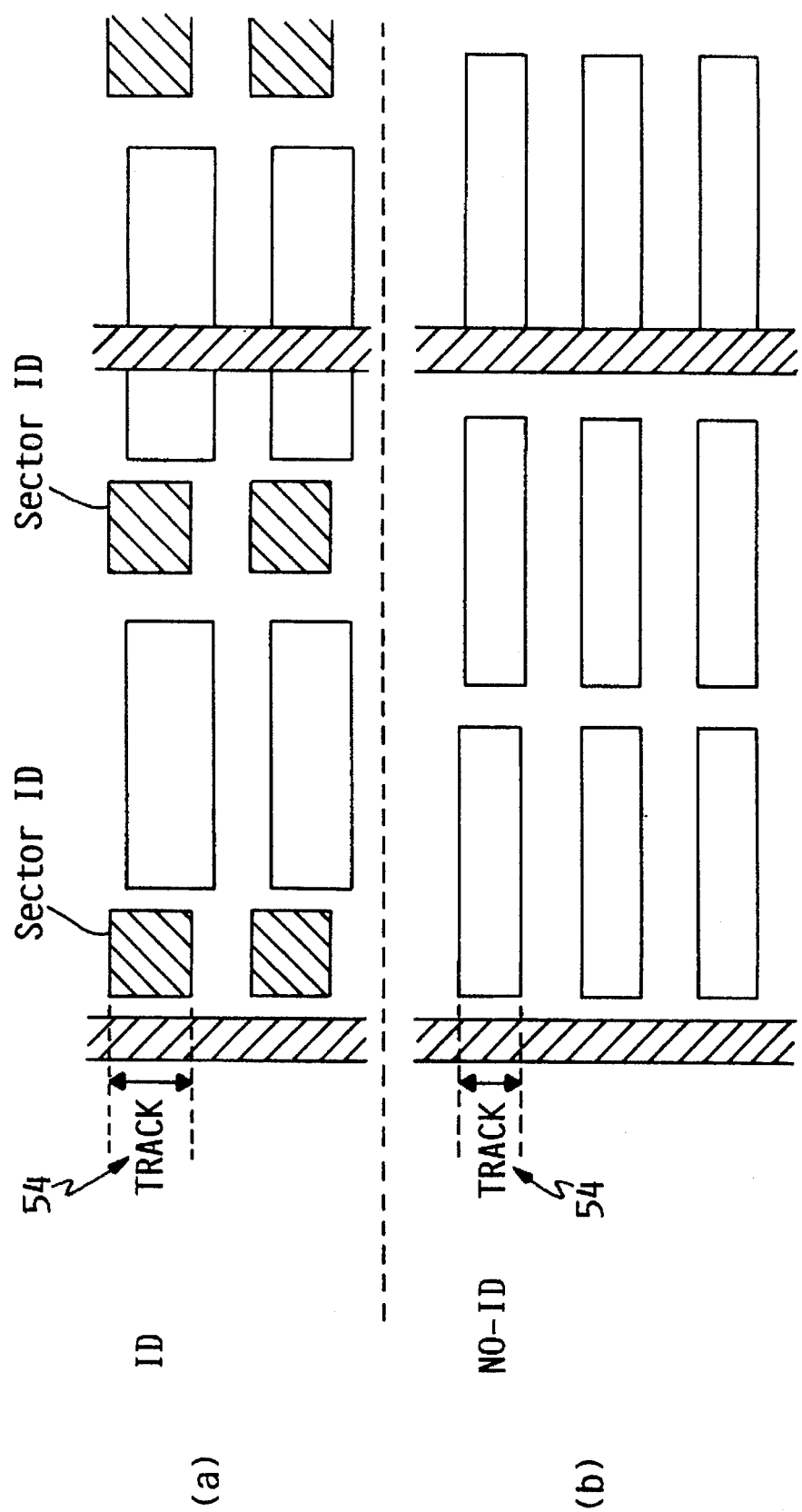
FIG. 13(a) is a schematic diagram illustrating the recording state of information in the disk of the prior art HDD device and FIG. 13(b) is a schematic diagram illustrating the recording state of information in the disk of the HDD device to which the invention is applicable.

As above-described, HDD device 10 to which the position invention is applicable does not require the sector ID to be recorded on the disk, thus allowing data to be written in aligned recording areas (see FIG. 13(b)). Therefore, as a condition of the magnetic head which is required for obtaining position information from the servo area 50, only an offset in spacing between the read and write elements during turning of arms should be considered. It is not necessary to consider the amount of off-track caused by specifying the magnetic head at different positions during read and write operation. Then, the gap length RDw can be specified up to a length approximately conforming to the track width TRKw. This will provide an increased track density in the radial direction of the disk for HDD device 10 according to the present invention.

As described above, by using the information recording disk in accordance with the present invention, information such as the structure of each sector can be referenced and the sector structure can readily be recognized even when data-only sectors are adjacent or a sector crosses the servo area. Thus, the present invention offers the advantage of an increased amount of information which can be recorded in the information recording disk.

Moreover, by using the disk drive system according to the present invention, read and write operations can be performed efficiently with fewer resources since storage means such as registers store the structure and operation of the current and next sectors.

A further advantage of the present invention is that more information can be handled without consuming extra storage on the hard disk drive device or information recording disk, since a requested sector can be determined by using a virtual ID table created with a bad sector table concerning any bad sector on the information recording disk.

A still further advantage offered by the present invention is that the track density in the radial direction of the disk can be increased by configuring the head gap length of the read portion to be approximately equal to the head gap length of the write portion or designing the head gap of the read portion to have substantially the same dimension as the track width.

What is claimed is:

1. An information recording disk comprising:

at least one generally radial servo area, the servo area storing position information for identifying a track position;

at least one track for recording data, the track containing a plurality of sectors, wherein at least one sector crosses the servo area, the servo area dividing the at least one sector into a first portion prior to the servo area and a second portion subsequent to the servo area, each of the plurality of sectors having an equal total capacity; and a table recorded on the disk for uniquely identifying each position of a plurality of sectors, wherein the table stores relationships among a physical sector identifier for identifying each sector on the track based on the servo area the track position, and a pre-servo area capacity of the sector, the pre-servo area capacity being equal to the capacity of the first portion.

2. The information recording disk of claim 1, wherein the sectors comprise good and bad sectors.

3. The information recording disk of claim 2, further comprising:

a list storage means recorded on the disk for successively storing as a pseudo logical sector identifier a logical sector identifier, the pseudo logical sector identifier being given to a bad sector when successively specifying a logical sector identifier for identifying each sector other than any bad sector contained in the track.

4. A disk drive system comprising:

an information recording disk having at least one track divided by at least one servo area, storing position information for identifying a track position and wherein an area without the servo area is divided so that sectors having equal total capacities are successively located, and wherein the servo area divides at least one sector into a first portion prior to the servo area and a second portion subsequent to the servo area;

a magnetic head for reading and writing information on the information recording disk;

at least one register for storing a current sector's structure and operation;

a table, recorded on the disk or in semiconductor memory, for uniquely identifying each position of a plurality of sectors, wherein the table stores the structure of each sector which represents relationships among a physical sector identifier for identifying each sector on the track based on the servo area, the track position, and a pre-servo area capacity of the sector, the pre-servo area capacity being equal to the capacity of the first portion; and a controller, operatively coupled to the at least one register, for controlling operations of the disk drive, the controller processing sectors in accordance with the current sector's structure and operation stored in the at least one register, the controller including:

(a) means for identifying a beginning of a sector based on the current sector's structure stored in the at least one register after identifying an end of the servo area by using an output signal from the magnetic head; and (b) means for updating the current sector's structure and operation stored in the at least one register in response to identifying the beginning of the sector, the current sector's structure being determined by referencing the table.

5. The disk drive of claim 4, wherein:

the at least one register further stores a next sector's structure and operation;

the controller updating the current sector's structure and operation stored in the at least one register by copying the next sector's structure and operation stored in the at least one register into the current sector's structure and operation, respectively, upon identifying the beginning of the next sector; and the controller updating the next sector's structure and operation stored in the at least one register by referencing the table during processing the current sector.

6. The disk drive system of claim 4 wherein the sectors comprise good and bad sectors, and wherein the disk drive system further comprises:

a list storage means, operatively coupled to the controller, for successively storing as a pseudo logical sector identifier a logical sector identifier, the pseudo logical sector identifier being given to a bad sector when successively specifying a logical sector identifier for identifying each sector other than any bad sector contained in the track; and calculating means, coupled to the list storage means, for calculating a physical sector position by referencing the list storage means to read number of logical sector position identifiers which is equal to or smaller than requested logical sector position identifiers, and adding the number being read to the requested logical sector position identifiers to calculate physical sector position identifiers for physical sectors corresponding to the requested logical sector identifiers.

7. The disk drive of claim 4 wherein the magnetic head comprises a recording portion for recording information in the information recording disk and a reading portion spaced apart by a predetermined amount from the recording portion for reading information from the information recording disk, the recording portion and the reading portion each comprising a head gap, and wherein the length of the head gap of the reading portion is configured so as to substantially conform to the length of the head gap of the recording portion.

8. The disk drive of claim 4 wherein the magnetic head comprises a recording portion for recording information in the information recording disk and a reading portion spaced apart by a predetermined amount from the recording portion for reading information from the information recording disk, the recording portion and the reading portion each comprising a head gap, and wherein the length of the head gap of the reading portion is configured so as to substantially conform to the width of the track.

9. A disk drive data storage system comprising:

a magnetic disk for storing information;

at least one servo area on the disk for storing position information for identifying track position;

at least one track divided for recording data on the disk, the track containing a plurality of sectors, wherein at least one sector crosses the servo area, the servo area dividing the at least one sector into a first portion prior to the servo area and a second portion subsequent to the servo area, each of the plurality of sectors having the same total capacity;

a magnetic head for reading and writing information on the disk;

a table, recorded on the disk or in semiconductor memory, for uniquely identifying each position of the plurality of sectors, wherein the table stores relationships among a physical sector identifier for identifying each sector on the track based on the servo area, the track position, and a pre-servo area capacity of the sector, the pre-servo area capacity being equal to the capacity of the first portion; and a controller, coupled to the magnetic head, for exercising control to determine a virtual track and virtual sector which corresponds to a position identifier for a requested logical sector, the controller including:

(a) means for identifying bad sectors and creating a bad sector table when a virtual sector and virtual track each of which having a predetermined total capacity are determined and a physical sector identifier representing the position of each sector other than any bad sector which is included in the track is successively specified as a logical sector identifier, the bad sector table comprising a virtual sector table wherein a physical sector identifier which should be given to a position of a bad sector is successively stored as a pseudo logical sector identifier and a virtual track table for storing a pseudo logical sector identifier for any bad sector which corresponds to the smallest physical sector identifier for the same track contained in the virtual sector table;

(b) means for creating a virtual ID table by using the virtual sector table and the bad sector table, said virtual ID table representing a structure of each virtual sector in a virtual track which contains a physical sector identifier for identifying each sector on the track based on the servo area, the track position, a pre-servo area capacity of the sector which is equal to the capacity of the first portion, and a logical sector identifier; and (c) means for determining a virtual track and virtual sector which correspond to the position identifier for the requested logical sector by referencing the virtual ID table and determining a corresponding physical sector in the determined virtual track and virtual sector.

10. The disk drive system according to claim 9, wherein the magnetic head comprises a recording portion for recording information in the magnetic disk and a reading portion spaced apart by a predetermined amount from the recording portion for reading information from the magnetic disk, the recording portion and the reading portion each comprising a head gap, and wherein the length of the head gap of the reading portion is configured so as to substantially conform to the length of the head gap of the recording portion.

11. The disk drive of claim 9 wherein the magnetic head comprises a recording portion for recording information in the magnetic disk and a reading portion spaced apart by a predetermined amount from the recording portion for reading information from the magnetic disk, the recording portion and the reading portion each comprising a head gap, and wherein the length of the head gap of the reading portion is configured so as to substantially conform to the width of the track.

\* \* \* \* \*

UNITED STATES PATENT AND TRADEMARK OFFICE
CERTIFICATE OF CORRECTION

PATENT NO. : 5,561,566

DATED : October 1, 1996

INVENTOR(S) : Yuji Kigami et al

It is certified that error appears in the above-identified patent and that said Letters Patent is hereby corrected as shown below:

In the Abstract, Line 6: "the litter region" should be
--the later region--

Claim 6, Column 17, Line 35: "to read number" should be
--to read a number--.

Signed and Sealed this

Twenty-sixth Day of May, 1998

*Attest:*

BRUCE LEHMAN

*Attesting Officer*  *Commissioner of Patents and Trademarks*